United States Patent [19]

Homan et al.

[11] 3,721,763

[45] March 20, 1973

[54] SINGLE LINE BI-DIRECTIONAL DATA TRANSMISSION SYSTEM

[75] Inventors: Alfred A. Homan, Collingswood; Herbert P. Brockman, Riverton, both of N.J.

[73] Assignee: The United States of America as represented by the Secretary of the Navy

[22] Filed: July 29, 1971

[21] Appl. No.: 167,409

[52] U.S. Cl. ............................................. 178/58 R

[51] Int. Cl. ............................................. H04l 5/14

[58] Field of Search ......179/15 BT, 15 Al; 178/58 R, 178/58 A, 59, 60; 343/175, 178

[56] References Cited

UNITED STATES PATENTS

| | | | |
|---|---|---|---|
| R25,699 | 12/1964 | Kidd | 179/15 BT |
| 3,013,147 | 12/1961 | Guerth | 179/15 BT |
| 2,336,276 | 12/1943 | Van der Meulen | 179/15 BT |

*Primary Examiner*—Kathleen H. Claffy
*Assistant Examiner*—David L. Stewart
*Attorney*—R. S. Sciascia et al.

[57] ABSTRACT

Digital information is transmitted in either direction on a time sharing basis over a single transmission line having identical transmit/receive stations sending out pulse signals of one polarity and having detectors adapted to receive pulses of the opposite polarity. The detectors block pulses of the same polarity as those that are generated and transmitted from its own station. A transmission line is transformer coupled to each station with an inversion in the line so that the signal received at the opposite station is of inverted polarity to that transmitted.

6 Claims, 5 Drawing Figures

INVENTORS
ALFRED A. HOMAN
HERBERT P. BROCKMAN

BY [signature]

ATTORNEY

INVENTORS
ALFRED A. HOMAN
HERBERT P. BROCKMAN
BY
ATTORNEY

SINGLE LINE BI-DIRECTIONAL DATA TRANSMISSION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to transmission systems and more particularly to a pulse transmission system in which a single line is used for transmit and receive.

Present day pulse transmission systems utilize either a single line for transmission in both directions or separate lines for each direction. Among the drawbacks of using separate lines are both the added cost and extra space required by the additional line. Heretofore, in the single line transmission systems in order to have automatic operation that avoids manual switching, complex station equipment was required. One such system utilized filtering techniques in which signals could be transmitted in either direction over a single line between transmit-receive stations by transmitting signals of different frequencies at each station and having filters on the detector networks that passed only the frequency of the opposite station generated signal. Complex switching networks and logic systems have also been used to separate the transmitted signal from the received signal in order to prevent a receiver at one station from processing a signal from its own station.

SUMMARY OF THE INVENTION

Accordingly, it is a general purpose and object of the present invention to provide a simplified single line transmission system in which all components at each station are the same. It is further intended to provide a system in which complex filtering, logic and switching networks are avoided and the problems encountered in manual switching systems are obviated.

This is accomplished according to the present invention by having each station generate pulses of the same predetermined polarity and to reject these pulses at the detector network associated with the station that generates and transmits the pulses. The generated signal is transformer coupled to a line that inverts the signal by means of transformer coupling and inverting the conductors of the line so that the opposite end station receives a signal of opposite polarity. The detector techniques at the opposite end station are identical to that at the transmitting station. However, due to the inversion of the polarity of the generated signal, the opposite end detector processes the generated signal from the other station while rejecting a signal generated at its own station.

DESCRIPTION OF THE PREFERRED EMBODIMENT

Figure 1:
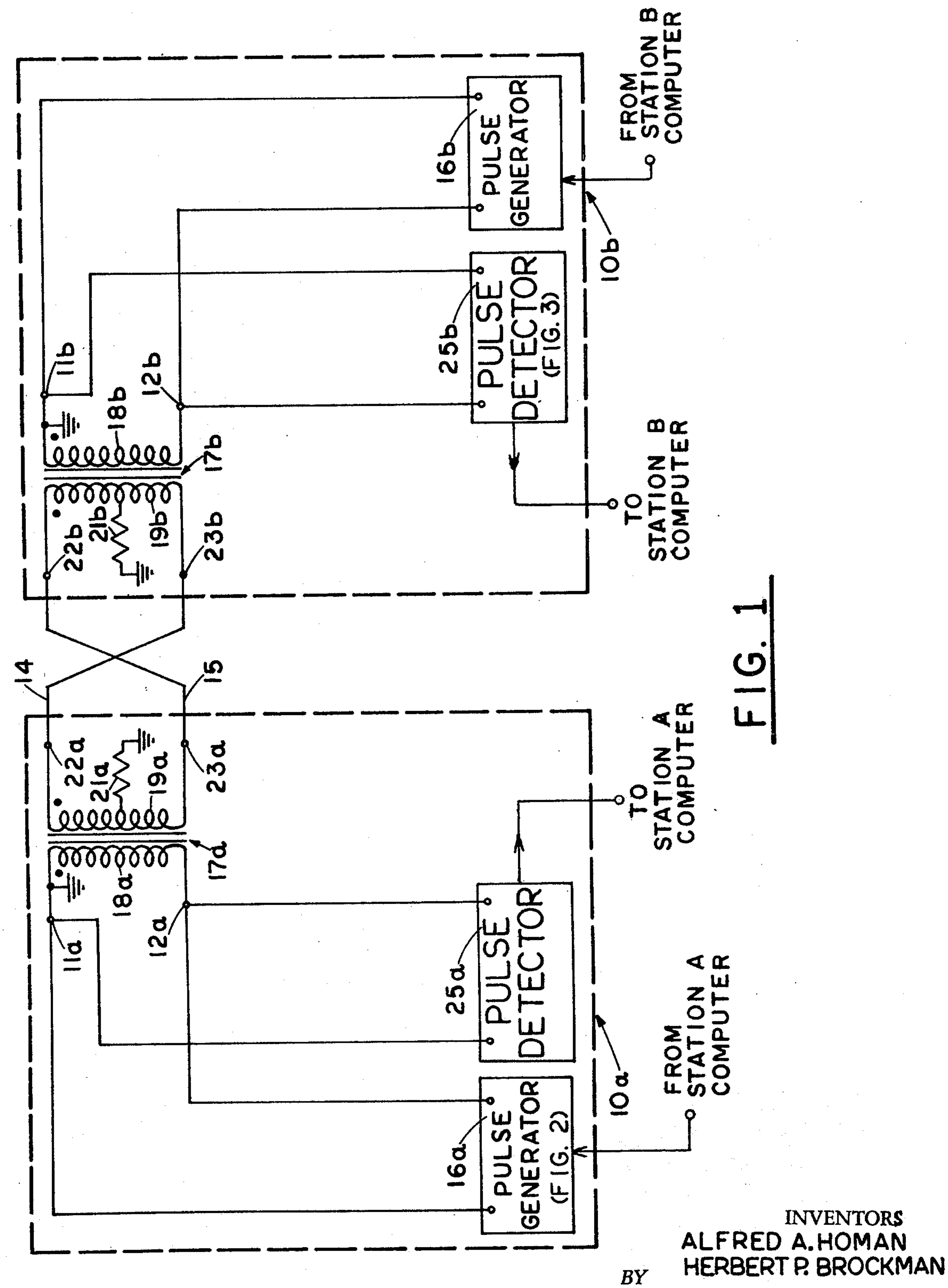
FIG. 1 is a schematic and block diagram of a preferred embodiment according to the present invention.

Referring now to FIG. 1 there is shown a digital pulse transmission system with two identical stations shown as station A 10*a* and station B 10*b*. Intermediate these stations 10*a* and 10*b* is a balanced line having conductors 14 and 15. Each of stations A and B have identical components so that some of the components associated with station B 10*b* will not be described; it being understood that station B 10*b* has identical components as station A 10*a* denoted with the same numeral and distinguishing by use of the letter *b* in place of *a*.

Station A 10*a* includes a pulse generator 16*a* that generates pulses to a transformer 17*a* having a first winding 18*a* with terminals 11*a* and 12*a* and a second winding 19*a* with terminals 22*a* and 23*a*. The first winding 18*a* is grounded at the end of the winding having terminal 11*a*. The second winding 19*a* has a center tap to ground through resistor 21*a*. The terminals 22*a* and 23*a* are connected respectively to conductors 14 and 15. A pulse detector 25*a* adapted to receive pulses of a polarity opposite to those generated is connected to winding 18*a* at terminals 11*a* and 12*a*.

The transformers 17*a* and 17*b* have appropriate polarity markings and the conductors 14 and 15 are interposed so that the lines 14 and 15 are connected with opposite polarity windings 19*a* and 19*b* on the respective transformers 17*a* and 17*b*. As a result the polarity of the pulses when received at the opposite end station are of a different polarity than they appear when generated. Furthermore lines 14 and 15 are ungrounded due to the center taps of windings 19*a* and 19*b* being grounded.

Figure 2:
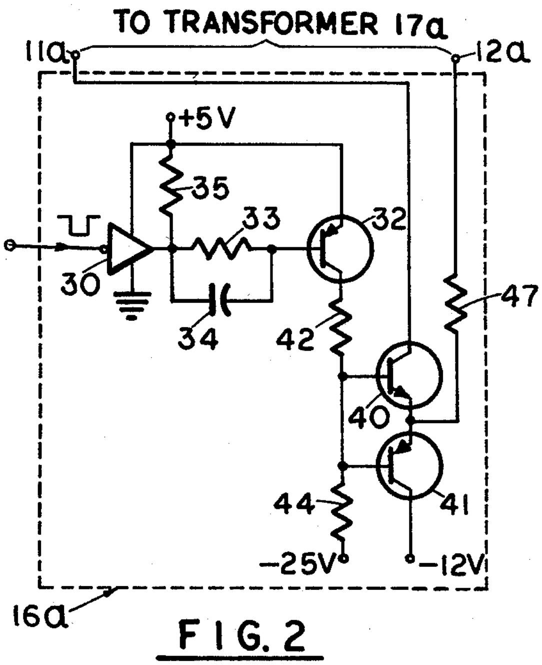
FIG. 2 represents an embodiment of a pulse generator of FIG. 1.

Referring now to FIG. 2 there is shown pulse generator 16a which generates negative polarity pulses and which is identical to pulse generator 16*b* shown in FIG. 1. The generator 16*a* is adapted to receive logic level signals at an inverter 30 from a computer (not shown) or other device adapted to supply these signals. As an example the pulses received have a high level of +5 volts and a low level of 0 volts. The inverter 30 supplies a high level output signal in response to receiving a low level input signal. The output of inverter 30 is connected to the base of a PNP transistor 32 through a parallel circuit comprising resistor 33 and capacitor 34. A resistor 35 is connected to the output of inverter 30 and provides a bias between the emitter and the base of a PNP transistor 32. A biasing signal of +5 volts is applied directly to the emitter of transistor 32 and through resistor 35 and the parallel combination of resistor 33 and capacitor 34 to the base of the transistor 32. In addition a path to ground is provided for the +5 volt source through inverter 30 when the input level to inverter 30 is high. When inverter 30 receives a low level input pulse this ground is removed.

The collector of transistor 32 is connected to the bases of both transistors 40 and 41 through a resistor 42. A bias of −25 volts is connected to the bases of transistors 40 and 41 through a dropping resistor 44. The values of resistors 42 and 44 are so selected that when transistor 32 is conducting, a positive level signal is applied to the bases of transistors 40 and 41. A biasing signal of −12 volts is applied to the collector of transistor 41. Transistor 40 is of the NPN type and transistor 41 is of the PNP type with the emitters of transistors 40 and 41 connected in common. Transistor 41 provides an output signal for generator 16*a* when conducting. The collector and emitter electrodes of transistor 40 are connected across transformer 17*a* through terminals 11*a* and 12*a*. Intermediate the emitter electrode of transistor 40 and terminal 12*a* is a resistor 47.

Figure 3:
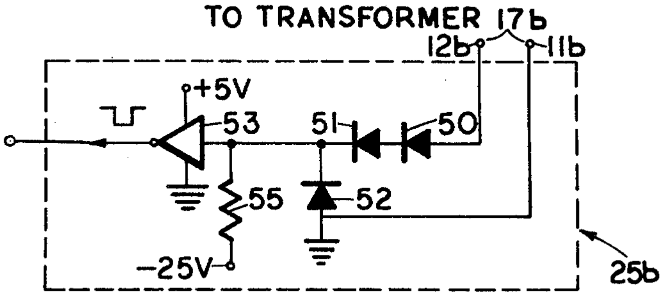
FIG. 3 represents an embodiment of a pulse detector of FIG. 1.

FIG. 3 shows the pulse detector 25*b* which is identical to pulse detector 25*a* shown in FIG. 1. The detector 25*b* has a pair of series connected diodes 50 and 51 with the anode of diode 50 connected to transformer 17*b* through terminal 12*b*. The cathode of diode 51 is connected to the cathode of diode 52 whose anode is grounded. Positive signals received at terminal 12*b* are transmitted through diodes 50 and 51 to an inverter 53. A resistor 55 receives a −25 volt bias signal and is connected to the input of inverter 53 and in series with a grounded diode 52 so that the input of amplifier 53 is kept slightly negative prior to receipt of a positive pulse input. A bias voltage of +5 volts is also applied to inverter 53. The inverter 53 transmits a low level pulse upon receipt of a positive polarity signal for further processing by a computer (not shown) or other device adapted to receive logic level signals.

The operation of the device will now be explained with reference to FIGS. 1, 2 and 3. Prior to receipt of a low level pulse by inverter 30, parts of the negative pulse generator 16*a* respond to the bias voltages in the following manner. Transistor 32 receives +5 volts bias at its emitter electrode and a reduced voltage through a dropping circuit comprising of resistor 35 in series with grounded inverter 30. Therefore the voltage at the input of base electrode of transistor 32 is of sufficiently lower magnitude than that at the emitter electrode to bias transistor 32 into a conducting state. The divider circuit from the collector of transistor 32 comprising resistors 42 and 44 receive at opposite ends the −25 volts input bias and the +5 volt bias. The resistors 42 and 44 have such ohmic value so that the voltage applied to the bases of transistors 40 and 41 is of positive polarity. The emitters of transistors 40 and 41 are connected to ground through resistor 47 and winding 18. As a result transistor 41 is biased in the OFF position leaving transistor 40 with no voltage signal applied to either the emitter or collector electrodes.

Upon inverter 30 receiving a low level input pulse, a positive pulse is supplied to the base of transistor 32 thereby rendering the transistor 32 nonconductive. The bases of transistors 40 and 41, therefore, receive a negative bias from the −25 volt supply and PNP transistor 41 is rendered conductive and NPN transistor 40 nonconductive. As a result the −12 volt supply applied to the collector of transistor 41 is supplied to resistor 47 which forms a voltage divider network with the output so that a −6 volt supply appears across terminals 12*a* and 11*a*. It is to be noted at this time that detector circuit 25*a* blocks the −6 volt signal by means of diodes 50 and 51.

Since the station described was that of station A 10*a* then the negative voltage signal is supplied across transformer winding 18*a*. The second winding 19*a* is center tapped to ground so that a negative level signal appears on conductor 15 and a positive level signal on conductor 14. This signal is supplied to transformer 17*b* and it can be seen that the signal that then appears at terminal 11*b* is grounded and the one at terminal 12*b* is of positive polarity.

Referring now to FIG. 3 where pulse detector 25*b* represents the detector at station B receiving the positive polarity signal, it can be seen that this positive signal is conducted through diodes 50 and 51 past diode 52 to inverter 53. Inverter 53 supplies a high level +5 volt signal prior to the receipt of the positive pulse and upon receipt of the pulse supplies a low level pulse of 0 volts.

Figure 5:
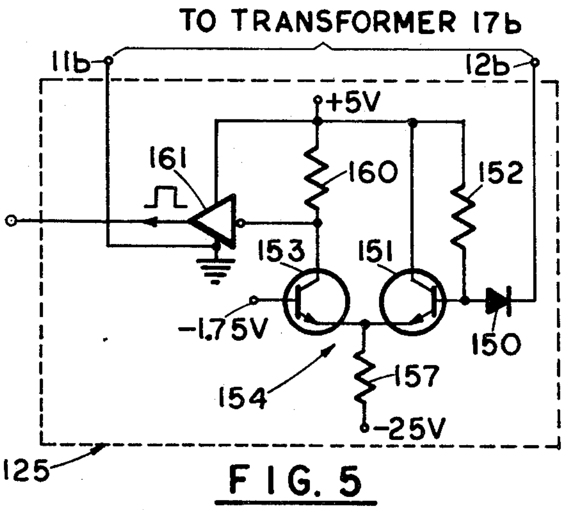
FIG. 5 represents an alternate embodiment of a pulse detector of FIG. 1.
Figure 4:
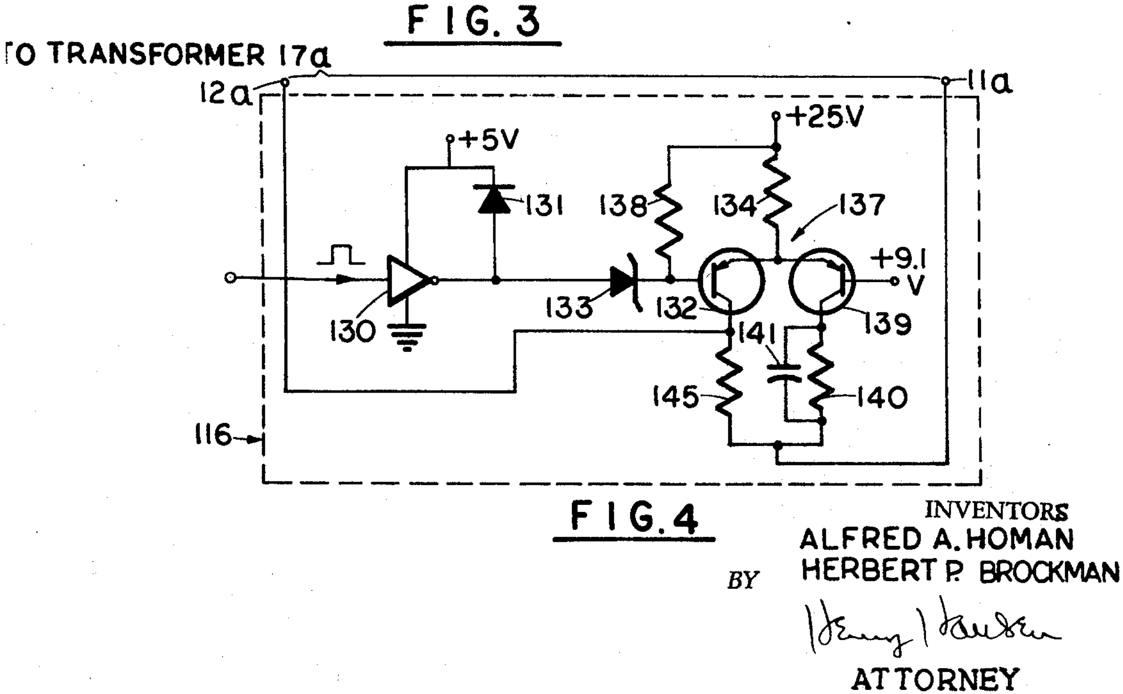
FIG. 4 represents an alternate embodiment of a pulse generator of FIG. 1.

Alternate embodiments of pulse generator 16*a* and detector 25*a* are shown in FIGS. 4 & 5 respectively where a positive polarity signal is generated by pulse generator 116 and a negative polarity pulse detector 125 are used. The pulse generator 116 and detector 125 may be used at both stations A and B where high level pulse signals are utilized. A high level pulse digital input signal is applied to an inverter 130 whose output is connected to a diode 131 with the diode cathode and the inverter 130 receiving a +5 volt bias voltage. The inverter 130 has a +5 volt output until a high level input pulse causes the output level to go to 0 volts. The output of inverter 130 is also connected to the base of a transistor 132 through a zener diode 133. A +25 volt bias is applied to the emitters of transistors 132 and 139 through a resistor 134. The emitters of transistors 132 and 139 are connected together to form differential amplifier 137. A resistor 138 provides a dropping voltage from the +25 volt supply to the base of transistor 132. A +9.1 volt supply is supplied to the base of transistor 139 thereby rendering the transistor conductive. The collector of transistor 139 is grounded through the parallel combination of resistor 140 and capacitor 141. The collector of transistor 132 is connected to transformer 17*a* through terminal 12*a* and to one side of resistor 145. The other side of resistor 145 is connected to terminal 11*a*.

Detector 125 is connected to transformer 17*b* through terminals 11*b* and 12*b*. A diode 150 has its cathode adapted to receive negative polarity signals from terminal 12*b* and its anode connected to the base of transistor 151. A dropping resistor 152 is connected between transistor 151 base and collector electrodes. The emitter of transistor 151 is connected to the emitter of a transistor 153 to form a differential amplifier 154. A −25 volt bias is supplied to the emitters of transistors 151 and 153 through a resistor 157. A bias voltage of −1.75 volts is applied to the base of transistor 153 so that when transistor 151 is conducting the −25 volt bias is sufficiently reduced across resistor 157 so that transistor 153 becomes nonconducting. The collector of transistor 153 is connected to a +5 volt supply through resistor 160. The collector of transistor 153 is also connected to inverter 161 that inverts the negative signal appearing at its input when transistor 153 is conducting to a high level signal at its output.

The operation of the alternate embodiment using the generator 116 and detector 125 of FIGS. 4 and 5 will now be described. Prior to a digital input being supplied to inverter 130 the transistor 139 is conducting. Transistor 132 is nonconductive due to the dropping resistor 134 providing a lower bias to the emitter of transistor 132 than that provided at its base as there is no conduction through resistor 138. Upon receipt of a digital input high level signal at amplifier 130 a low level output appears at the anode of zener diode 133. This low level signal is sufficient to break down zener diode 133 so that a conduction path is formed from the +25 volt supply through resistor 138, zener diode 133 and inverter 130 to ground. This biases transistor 132 into a conducting state so that a positive polarity signal is supplied to transformer 17*a* through terminal 12*a* from the bias signal of +25 volts through emitter and collector electrodes of transistor 132. The value of the elements are chosen so that the signal applied to transformer 17*a* is of an amplitude of +6 volts. Obviously the negative pulse detector 125 blocks the positive signal at diode 150.

The transmission of this signal to the opposite station is similar to that with respect to the other embodiment except polarities are reversed. It is apparent that the signal then received at the opposite end by negative pulse detector 125 is of negative polarity and is provided to the base of transistor 151 through diode 150. Prior to this pulse being received transistor 151 is conducting and transistor 153 is nonconducting. Upon a pulse being received at the base of transistor 151 the transistor becomes nonconductive turning on transistor 153 so that a conductive path is provided between the +5 volt bias through resistor 160, transistor 153 and resistor 157 to the −25 volt bias supply. This circuit so divides the voltage so that the signal applied to the input of inverter 161 is of negative polarity. Upon receipt of this signal inverter 161 provides a high level output pulse.

It has thus been shown stations adapted to receive high or low level digital signals for transmission of signals to a distant station. The device provides interfacing systems so that the signals transmitted and received are appropriately polarized and of sufficient amplitude for transmission to a distant station. In addition the transmission lines are inverted so that the generated and detected signals of opposite polarity removing all need for switching components at the respective stations.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A bidirectional transmission system station comprising:

a pulse generator having an inverter for providing a high level output pulse signal upon receipt of a low level pulse signal, a first transistor connected to receive said first inverter output signal and switching from conductive to nonconductive upon receipt of a high level signal from said inverter amplifier gate, a second normally conductive transistor with a base electrode operatively connected to said first transistor for switching to a nonconductive state upon said first transistor becoming nonconductive and a third transistor having a base electrode connected in common with the base electrode of said second transistor, an emitter electrode connected in common with the emitter electrode of said second transistor and a collector electrode adapted to receive a negative bias voltage for conducting said negative bias signal upon said first transistor switching to the nonconductive state;

a detector connected to said pulse generator having diode means for providing conduction for positive polarity signals and rejecting negative polarity signals, bias means connected to the output of said diode means for providing a normally negative polarity signal at the output of said diode means and providing a positive polarity signal upon said diode means conducting a positive polarity signal and inverting means connected to said diode means and said bias means for providing a low level signal upon receipt of a positive polarity signal; and transformer means having a first and second winding with said first winding having one end grounded connected to said pulse generating means and said detecting means and a second winding having a center tap grounded for providing an output coupling for said pulse generating means and an input coupling for said detecting means.

2. A bidirectional transmission system station comprising:

a pulse generator having an inverter for providing a low level output pulse upon receipt of a high level pulse signal, a zener diode connected to receive said inverter output pulse and biased so as to conduct in the reverse direction upon receipt of a low level pulse and a first differential amplifier having a first and second transistor with the base of said first transistor connected to said zener diode for having said first transistor provide a positive polarity output signal upon said zener diode conducting in the reverse direction;

a detector connected to said pulse generator having diode means for providing conduction for negative polarity signals and rejecting positive polarity signals, a second differential amplifier connected to said diode means and having a third and fourth transistor with said third transistor normally conducting and said fourth transistor providing conduction upon said differential amplifier receiving a negative polarity signal from said diode means and inverter means connected to said fourth transistor for providing a high level digital output signal upon said fourth transistor providing conduction; and transformer means having a first and second winding with said first winding having one end grounded connected to said pulse generating means and said detecting means and a second winding having a center tap grounded for providing an output coupling for said pulse generating means and an input coupling for said detecting means.

3. A bidirectional transmission system comprising:

first and second station means operatively connected to each other, each of said station means including pulse generating means for receiving a low level pulse signal and for producing a negative pulse signal and having an inverter for providing a high level output pulse signal upon receipt of the low level pulse signal, a first transistor connected to receive the inverter output signal and to switch from a conductive to a nonconductive state upon receipt of the high level output pulse signal from said inverter, a second transistor with a base electrode operatively connected to said first transistor for switching from a conductive to a nonconductive state upon said first transistor becoming nonconductive, and a third transistor having a base electrode connected in common with the base electrode of said second transistor, an emitter electrode connected in common with the emitter electrode of said second transistor and a collector electrode adapted to receive a negative bias signal for producing said negative pulse signal upon said first transistor switching to the nonconductive state, and each of said stations further including detecting means for receiving positive pulse signals and rejecting the negative pulse signals, and each of said stations further including transformer means having a first winding connected to receive the negative pulse signals from said pulse generating means and to transmit the positive pulse signals to said detecting means, said first winding being grounded at one end thereof, and a second winding being grounded at a center tap thereof; and transmission means interposed between respective second windings of transformer means for reversing the polarity of pulse signals transmitted between said first and second stations.

4. A bidirectional transmission system according to claim 3 wherein said detecting means further comprises:

diode means for providing conduction for positive polarity signals and rejecting negative polarity signals;

bias means connected to the output of said diode means for providing a normally negative polarity signal at the output of said diode means and providing a positive polarity signal upon said diode means conducting a positive polarity signal; and inverting means connected to said diode means and said bias means for providing a low level signal upon receipt of a positive polarity signal.

5. A bidirectional transmission system comprising:

first and second station means operatively connected to each other, each of said station means including pulse generating means for receiving a high level pulse signal and for producing a positive pulse signal and having an inverter for providing a low level output pulse signal upon receipt of the high level pulse signal, a zener diode connected to receive said inverter output pulse and biased so as to conduct in the reverse direction upon receipt of a low level pulse, and a first differential amplifier having a first and second transistor with a base of said first transistor connected to said zener diode for having said first transistor provide a positive polarity output signal upon said zener diode conducting in the reverse direction, and each of said stations further including detecting means for receiving negative pulse signals and rejecting the positive pulse signals, and each of said stations further including transformer means having a first winding connected to receive the positive pulse signals from said pulse generating means and to transmit the negative pulse signals to said detecting means, said first winding being grounded at one end thereof, and a second winding being grounded at a center tap thereof; and transmission means interposed between respective second windings of transformer means for reversing the polarity of pulse signals transmitted between said first and second stations.

6. A bidirectional transmission system according to claim 5 wherein said detecting means further comprises:

diode means for providing conduction for negative polarity signals and rejecting positive polarity signals;

a second differential amplifier connected to said diode means and having a third and fourth transistor with said third transistor normally conducting and said fourth transistor providing conduction upon said differential amplifier receiving a negative polarity signal from said diode means;

inverter means connected to said fourth transistor for providing a high level digital output signal upon said fourth transistor providing conduction.

* * * * *